US011881804B2

United States Patent
Kawamoto et al.

(10) Patent No.: US 11,881,804 B2
(45) Date of Patent: Jan. 23, 2024

(54) ROTATING ELECTRIC MACHINE DRIVE DEVICE

(71) Applicant: Mitsubishi Electric Corporation, Tokyo (JP)

(72) Inventors: Hideaki Kawamoto, Tokyo (JP); Tomoya Tachibana, Tokyo (JP); Matahiko Ikeda, Tokyo (JP); Yoshihiko Kimpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/296,319

(22) PCT Filed: Nov. 29, 2018

(86) PCT No.: PCT/JP2018/044007
§ 371 (c)(1),
(2) Date: May 24, 2021

(87) PCT Pub. No.: WO2020/110259
PCT Pub. Date: Jun. 4, 2020

(65) Prior Publication Data
US 2022/0045643 A1   Feb. 10, 2022

(51) Int. Cl.
*H02P 29/68* (2016.01)
*H02P 27/06* (2006.01)

(52) U.S. Cl.
CPC .............. *H02P 29/68* (2016.02); *H02P 27/06* (2013.01); *H02P 2201/09* (2013.01)

(58) Field of Classification Search
CPC ...... H02P 29/68; H02P 27/06; H02P 2201/09; H02P 23/28; H02P 27/085; Y02T 10/70;
(Continued)

(56) References Cited

U.S. PATENT DOCUMENTS

2010/0102627 A1   4/2010   Abe
2010/0193266 A1*  8/2010   Seo .................... H01M 10/482
                                                    307/9.1
(Continued)

FOREIGN PATENT DOCUMENTS

CA    2763682 C  *  8/2012  ............ B60L 3/0046
JP    2010-104178 A    5/2010
(Continued)

OTHER PUBLICATIONS

Written opinion for PCT/JP2018/044007 dated Feb. 26, 2019.
(Continued)

*Primary Examiner* — Bickey Dhakal
(74) *Attorney, Agent, or Firm* — Sughrue Mion, PLLC; Richard C. Turner (57) ABSTRACT

Provided is a drive device for a rotating electric machine, including: a power conversion unit configured to convert DC power supplied from a storage battery into AC power, and to supply the AC power to a rotating electric machine; and a control unit output a switching signal to the power conversion unit. The control unit is configured to set, when the storage battery is to be charged, in a case in which a temperature of the storage battery input from an outside is lower than a set temperature suitable for charging, the switching signal for the power conversion unit so as to be different from the switching signal in a normal drive state of the rotating electric machine.

6 Claims, 7 Drawing Sheets

(58) Field of Classification Search
CPC ..... Y02T 10/7072; Y02T 10/72; Y02T 90/14; B60L 2210/14; B60L 2240/545; H02J 7/00041
See application file for complete search history.

(56) References Cited

U.S. PATENT DOCUMENTS

| | | | |
|---|---|---|---|
| 2012/0081045 A1* | 4/2012 | Takamatsu | B60L 3/003 318/400.3 |
| 2015/0321573 A1 | 11/2015 | Sato | |
| 2016/0141982 A1* | 5/2016 | Yim | H02P 6/16 318/400.17 |
| 2018/0162379 A1 | 6/2018 | Mizuno et al. | |
| 2020/0259360 A1* | 8/2020 | Tagawa | H01M 10/667 |
| 2021/0043990 A1* | 2/2021 | Dan | H01M 10/63 |

FOREIGN PATENT DOCUMENTS

| | | | | |
|---|---|---|---|---|
| JP | 2015-214188 A | 12/2015 | | |
| JP | 2018-98857 A | 6/2018 | | |
| WO | WO-02065628 A1 * | 8/2002 | ............ | B60L 15/007 |

OTHER PUBLICATIONS

International search report for PCT/JP2018/044007 dated Feb. 26, 2019.
Communication dated May 10, 2022 from the Japanese Patent Office in Application No. 2020-557480.

* cited by examiner

ROTATING ELECTRIC MACHINE DRIVE DEVICE

TECHNICAL FIELD

The present invention relates to a drive device for a rotating electric machine, and more particularly, to a drive device for a rotating electric machine to be driven by power supplied from a storage battery.

BACKGROUND ART

In a vehicle having a rotating electric machine mounted thereon, for example, an electric vehicle, a storage battery configured to supply power to the rotating electric machine is required to be charged. In this case, when a temperature of the storage battery is lower than a temperature suitable for charging, the temperature of the storage battery is required to be raised up to the temperature suitable for charging by discharging the storage battery before the charging is started.

In Patent Literature 1, there is described an invention in which, when there is a heat conversion request of drive power of the rotating electric machine, a frequency of a switching signal to be output to a DC/AC inverter circuit is controlled, to thereby intentionally reduce a power conversion efficiency of the DC/AC inverter circuit. In Patent Literature 1, when the power conversion efficiency of the DC/AC inverter circuit is reduced, a discharge amount of the storage battery is increased, resulting in rise of the temperature of the storage battery.

CITATION LIST

Patent Literature

[PTL 1] JP 2018-098857 A

SUMMARY OF INVENTION

Technical Problem

In Patent Literature 1, the frequency of the switching signal to be output to the DC/AC inverter circuit is controlled based on the number of pulses per unit cycle of an electrical angle of the rotating electric machine. In this case, when the vehicle is stopped, the unit cycle of the electrical angle of the rotating electric machine has an infinite length. Therefore, when the storage battery is to be charged while the vehicle is stopped, the temperature of the storage battery cannot be raised through use of the technology of Patent Literature 1.

The present invention has been made to solve the above-mentioned problem, and has an object to provide a drive device for a rotating electric machine, which is capable of raising a temperature of a storage battery even under a state in which a rotating electric machine is not rotated.

BRIEF DESCRIPTION OF DRAWINGS

Solution to Problem

In order to solve the above-mentioned problem, according to one embodiment of the present invention, there is provided a drive device for a rotating electric machine, including: a power conversion unit configured to convert DC power supplied from a storage battery into AC power, and to supply the AC power to a rotating electric machine; and a control unit configured to output a switching signal to the power conversion unit, and to set, when the storage battery is to be charged, in a case in which a temperature of the storage battery input from an outside is lower than a set temperature suitable for charging, the switching signal for the power conversion unit so as to be different from the switching signal in a normal drive state of the rotating electric machine.

Advantageous Effects of Invention

According to the drive device for a rotating electric machine of the present invention, the temperature of the storage battery can be raised even under the state in which the rotating electric machine is not rotated.

DESCRIPTION OF EMBODIMENTS

Now, with reference to the accompanying drawings, embodiments of a drive device for a rotating electric machine disclosed by the subject application are described in detail by means of an example of a case in which the drive device for a rotating electric machine according to the present invention is applied to a vehicle. However, the embodiments described below are merely examples, and the present invention is not limited to those embodiments.

First Embodiment

Figure 1:
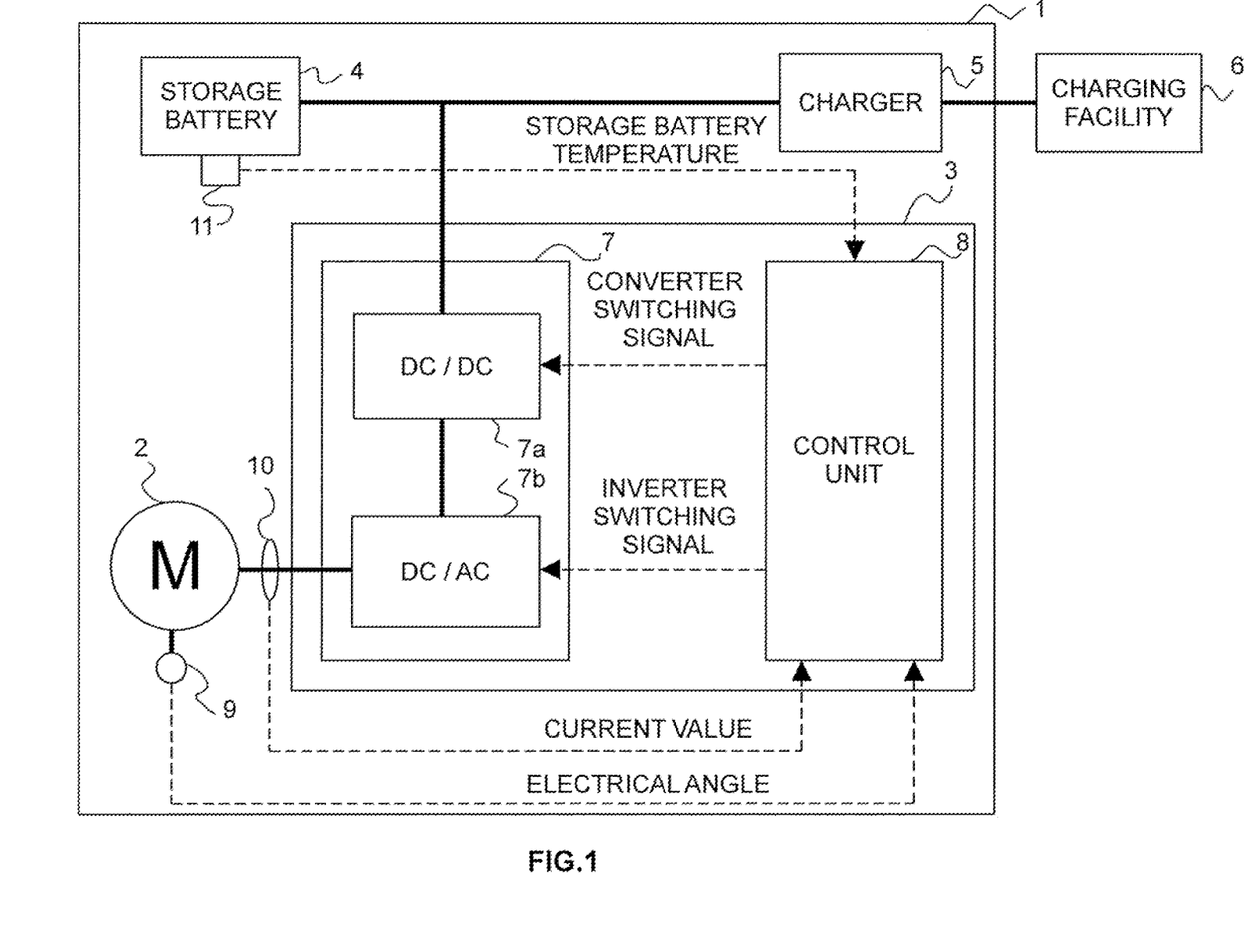
FIG. 1 is a block diagram for illustrating configurations of a charging facility and a vehicle having mounted thereon a drive device for a rotating electric machine according to a first embodiment of the present invention.

FIG. 1 is a block diagram for illustrating configurations of a charging facility and a vehicle having mounted thereon a drive device for a rotating electric machine according to a first embodiment of the present invention.

(Configuration of Vehicle 1)

A vehicle 1 includes a rotating electric machine 2, a drive device 3, a storage battery 4, and a charger 5. Further, a charging facility 6 is installed outside of the vehicle 1. The charging facility 6 can supply AC power when the storage battery 4 of the vehicle 1 is charged.

At the time of power running of the vehicle 1, the rotating electric machine 2 is driven by three-phase AC power supplied from the drive device 3. Further, at the time of regeneration of the vehicle 1, the rotating electric machine 2 outputs three-phase AC power generated by the rotating electric machine 2 itself to the drive device 3.

The drive device 3 includes a power conversion unit 7 and a control unit 8. The drive device 3 is configured to control transfer of power between the rotating electric machine 2 and the storage battery 4.

The power conversion unit 7 includes a DC/DC converter circuit 7a and a DC/AC inverter circuit 7b. The DC/DC converter circuit 7a and the DC/AC inverter circuit 7b are configured to operate based on switching signals input from the control unit 8.

At the time of power running of the vehicle 1, the power conversion unit 7 converts DC power supplied from the storage battery 4 into three-phase AC power, and supplies the three-phase AC power to the rotating electric machine 2. Further, at the time of regeneration of the vehicle 1, the power conversion unit 7 converts the three-phase AC power generated by the rotating electric machine 2 into DC power, and supplies the DC power to the storage battery 4.

The control unit 8 is configured to control the operation of the power conversion unit 7. In detail, the control unit 8 is configured to control the operation of the power conversion unit 7 by switching signals to be output to the DC/DC converter circuit 7a and the DC/AC inverter circuit 7b of the power conversion unit 7.

At the time of power running of the vehicle 1, the storage battery 4 supplies power stored in the storage battery 4 itself to the rotating electric machine 2 via the power conversion unit 7 of the drive device 3. At the time of regeneration of the vehicle 1, the storage battery 4 is charged with power generated by the rotating electric machine 2 and converted by the power conversion unit 7 of the drive device 3. Further, at the time of charging from the charging facility 6 while the vehicle 1 is stopped, the storage battery 4 is charged with power supplied from the charging facility 6 and converted by the charger 5.

At the time of charging from the charging facility 6 to the storage battery 4 of the vehicle 1, the charger 5 converts the AC power supplied from the charging facility 6 into DC power, and supplies the DC power to the storage battery 4.

Further, an angle sensor 9 is mounted to the rotating electric machine 2. The angle sensor 9 is configured to detect an electrical angle of the rotating electric machine 2. The electrical angle of the rotating electric machine 2 detected by the angle sensor 9 is input to the control unit 8 of the drive device 3.

Further, a current sensor 10 is mounted to the rotating electric machine 2. The current sensor 10 is configured to detect a current value of the three-phase AC power between the rotating electric machine 2 and the power conversion unit 7. The current value detected by the current sensor 10 is input to the control unit 8 of the drive device 3.

Further, a temperature sensor 11 is mounted to the storage battery 4. The temperature sensor 11 is configured to detect a temperature of the storage battery 4. The temperature of the storage battery 4 detected by the temperature sensor 11 is input to the control unit 8 of the drive device 3.

(Operation of Drive Device 3 when Vehicle 1 is Running)

Next, an operation of the drive device 3 when the vehicle 1 is running is described. When the vehicle 1 is running, the vehicle 1 and the charging facility 2 are not connected to each other.

The control unit 8 of the drive device 3 controls a drive state of the rotating electric machine 2 based on the electrical angle of the rotating electric machine 2 detected by the angle sensor 9 and on the current value between the rotating electric machine 2 and the power conversion unit 7 detected by the current sensor 10.

In detail, the control unit 8 of the drive device 3 controls the drive state of the rotating electric machine 2 by controlling a converter switching signal and an inverter switching signal to be output to the power conversion unit 7.

In more detail, at the time of power running of the vehicle 1, the control unit 8 of the drive device 3 controls the drive state of the rotating electric machine 2 so as to achieve the number of revolutions and torque required by the vehicle 1. Further, at the time of regeneration of the vehicle 1, the control unit 8 of the drive device 3 controls the drive state of the rotating electric machine 2 so as to output power to be charged to the storage battery 4.

Further, the control unit 8 of the drive device 3 controls the converter switching signal and the inverter switching signal so that power losses in the rotating electric machine 2 and the power conversion unit 7 are reduced.

Specifically, in order to reduce the power loss in the power conversion unit 7, it is required to perform control so that a conversion efficiency of the power conversion unit 7 is increased to be as high as possible. In general, in order to increase the power conversion efficiency of the power conversion unit 7, frequencies of the converter switching signal and the inverter switching signal may be decreased.

However, when the frequencies of the converter switching signal and the inverter switching signal are decreased, the controllability of the power conversion unit 7 is also reduced. Therefore, the control unit 8 of the drive device 3 determines the frequencies of the converter switching signal and the inverter switching signal and other parameters while considering the trade-off between the power conversion efficiency and the controllability of the power conversion unit 7.

In the following description, a drive state of the rotating electric machine 2 under a state in which the power conversion efficiency of the power conversion unit 7 is increased to be as high as possible while considering the trade-off between the power conversion efficiency and the controllability of the power conversion unit 7 as described above is defined as "normal drive state."

(Operation of Drive Device 3 when Vehicle 1 is Charged)

Next, an operation of the drive device 3 at the time of charging from the charging facility 6 to the storage battery 4 of the vehicle 1 is described. In this case, the vehicle 1 is stopped, and the vehicle 1 and the charging facility 6 are connected to each other.

As described above, at the time of charging from the charging facility 6 to the storage battery 4, when the temperature of the storage battery 4 is lower than a set temperature suitable for charging, the temperature of the storage battery 4 is required to be raised up to the set temperature suitable for charging by discharging the storage battery 4.

For this purpose, the control unit 8 of the drive device 3 is configured to execute control described below to cause the rotating electric machine 2 and the power conversion unit 7 to consume the power of the storage battery 4, to thereby raise the temperature of the storage battery 4.

(Control of Raising Temperature of Storage Battery 4)

The control unit 8 of the drive device 3 sets the frequencies of the converter switching signal and the inverter switching signal to be output to the power conversion unit 7 to frequencies different from those in the normal drive state of the rotating electric machine 2 while the vehicle 1 is running described above. In this case, the frequencies of the converter switching signal and the inverter switching signal have fixed cycles that are independent of the rotation cycle of the electrical angle of the rotating electric machine 2.

As described above, in the normal drive state of the rotating electric machine 2 while the vehicle 1 is running, the frequencies of the converter switching signal and the inverter switching signal to be output to the power conversion unit 7 are controlled so that the power conversion efficiencies of the rotating electric machine 2 and the power conversion unit 7 are maintained to be as high as possible.

When the frequencies of the converter switching signal and the inverter switching signal to be output to the power conversion unit 7 are set to frequencies different from those in the normal drive state of the rotating electric machine 2, the power conversion efficiencies of the rotating electric machine 2 and the power conversion unit 7 are reduced.

When the power conversion efficiencies of the rotating electric machine 2 and the power conversion unit 7 are reduced, a discharge amount of the storage battery 4 is increased. In this manner, the temperature of the storage battery 4 can be raised up to the set temperature suitable for charging. In this case, the frequencies of the converter switching signal and the inverter switching signal have fixed cycles that are independent of the rotation cycle of the electrical angle of the rotating electric machine 2. Therefore, this control can be performed even when the vehicle 1 is stopped.

As described above, in the drive device for a rotating electric machine according to the first embodiment of the present invention, the control unit is configured to set, when the storage battery is to be charged, in a case in which the temperature of the storage battery is lower than the set temperature suitable for charging, the switching signal to be output to the power conversion unit so as to be different from the switching signal in the normal drive state of the rotating electric machine. In this manner, even under a state in which the rotating electric machine is not rotated, the temperature of the storage battery can be raised.

Second Embodiment

Next, a drive device for a rotating electric machine according to a second embodiment of the present invention is described. The following second to fifth embodiments are the same as the first embodiment in the configuration of the drive device, and are different from the first embodiment only in the contents of the control of raising the temperature of the storage battery to be executed by the control unit. Therefore, in the following second to fifth embodiments, only the contents of the control of raising the temperature of the storage battery, which are the differences from the first embodiment, are described in detail.

The control unit 8 of the drive device 3 according to the second embodiment is configured to set, when the temperature of the storage battery 4 is to be raised, the frequencies of the converter switching signal and the inverter switching signal to predetermined maximum frequencies.

In general, the power loss of the power conversion unit 7 is proportional to the frequency of the switching signal. Therefore, when the frequency of the switching signal is increased, the power conversion efficiency of the power conversion unit 7 is reduced. When the power conversion efficiency of the power conversion unit 7 is reduced, the discharge amount of the storage battery 4 is increased. In this manner, the temperature of the storage battery 4 can be raised up to the set temperature suitable for charging.

However, when the frequency of the switching signal is increased, a heat generation amount in the power conversion unit 7 is also increased. Therefore, the predetermined maximum frequency is a maximum frequency within a range of temperatures in which the power conversion unit 7 can withstand, in consideration of a heat resistance characteristic of the power conversion unit 7.

Third Embodiment

The control unit 8 of the drive device 3 according to the third embodiment is configured to set a duty ratio of the converter switching signal so that a boost voltage of the DC/DC converter circuit 7a included in the power conversion unit 7 becomes a boost voltage at which a sum of the power losses of the rotating electric machine 2 and the power conversion unit 7 is maximum.

In general, the power loss of the rotating electric machine 2 is inversely proportional to the boost voltage of the DC/DC converter circuit 7a. However, when the boost voltage of the DC/DC converter circuit 7a becomes equal to or higher than a certain value, the power loss of the rotating electric machine 2 is not reduced any more.

Further, in general, the power loss of the DC/AC inverter circuit 7b is proportional to the boost voltage of the DC/DC converter circuit 7a. The power loss of the DC/DC converter circuit 7a itself depends on the circuit configuration, and varies in tendency with respect to the boost voltage.

In consideration of the above-mentioned matters, the control unit 8 of the drive device 3 according to the third embodiment is configured to set the duty ratio of the converter switching signal so that the boost voltage of the DC/DC converter circuit 7a becomes a boost voltage at which the sum of the power losses of the rotating electric machine 2 and the DC/DC converter circuit 7a and DC/AC inverter circuit 7b is maximum.

When the power losses of the rotating electric machine 2 and the power conversion unit 7 are increased, the discharge amount of the storage battery 4 is increased. In this manner, the temperature of the storage battery 4 can be raised up to the set temperature suitable for charging.

Fourth Embodiment

The control unit 8 of the drive device 3 according to the fourth embodiment is configured to set the inverter switching signal so that heat generation amounts of coils adjacent to each other in the rotating electric machine 2 are not simultaneously increased.

For this purpose, the control unit 8 of the drive device 3 is configured to set the inverter switching signal so that the electrical angle of the rotating electric machine 2 detected by the angle sensor 9 is matched with a phase at which a difference between a maximum value and a minimum value of a current amount of each phase of the rotating electric machine 2 is minimum.

In the following description, a current refers to a current having a positive or negative value. Further, a current amount refers to a current amount obtained by calculating a magnitude of a current, that is, an absolute value of a current.

Figure 2:
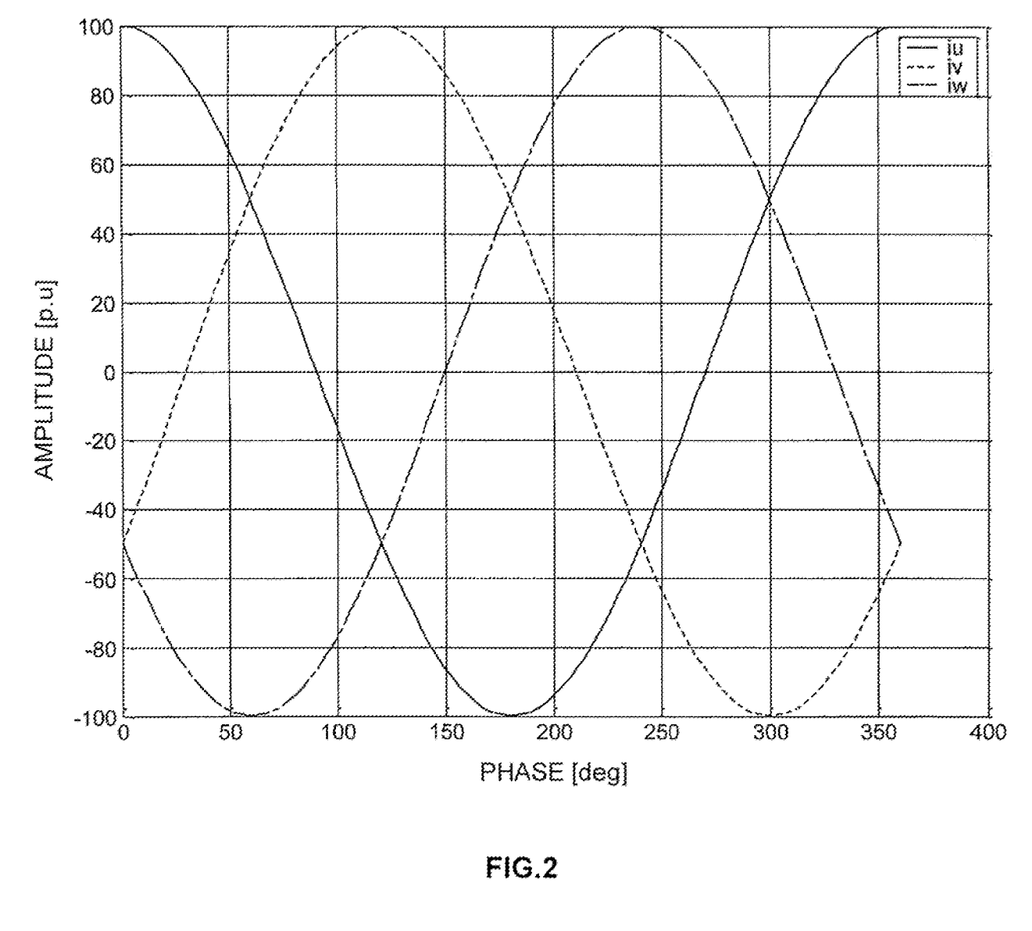
FIG. 2 is an example of a current phase of each phase of a rotating electric machine of FIG. 1.
Figure 3:
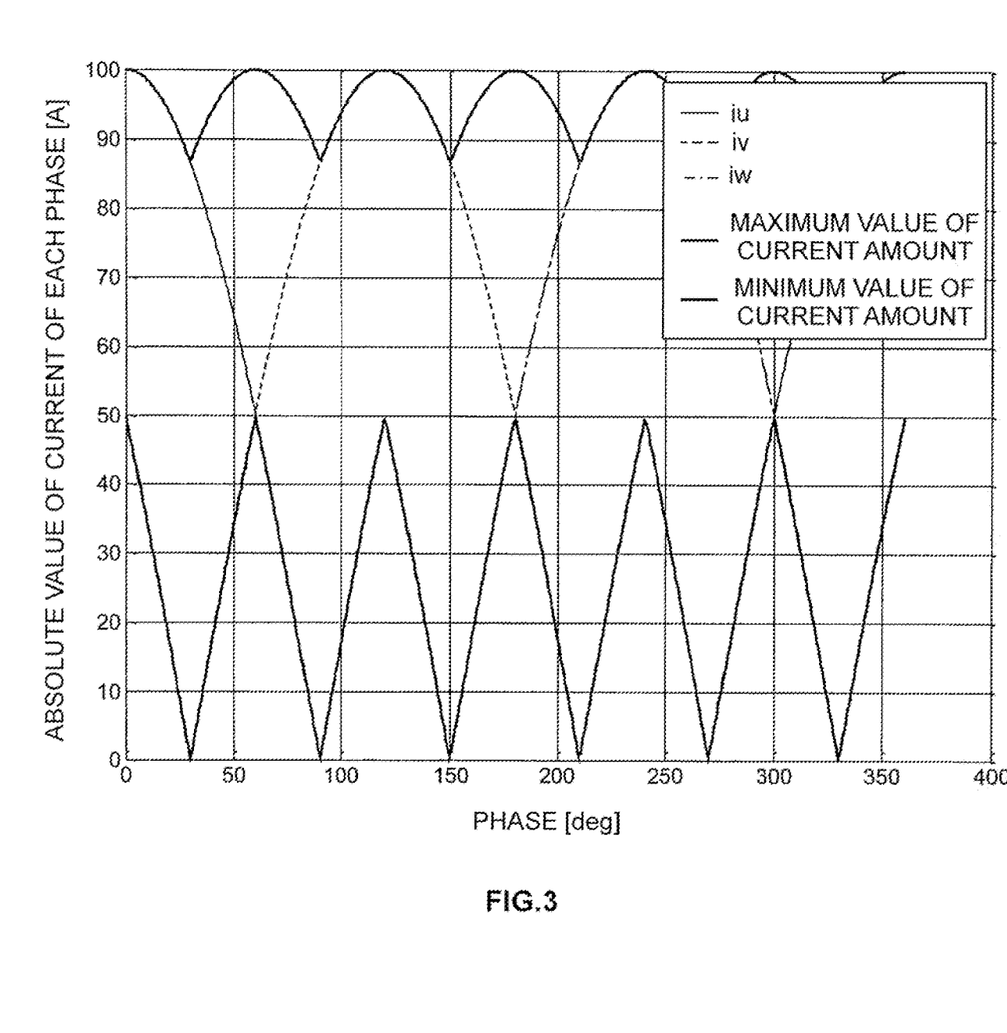
FIG. 3 is a graph obtained by extracting a maximum value and a minimum value of a current amount in each phase.

FIG. 2 is an example of the current phase of each phase of the rotating electric machine 2. Further, FIG. 3 is a graph obtained by extracting, from FIG. 2, the maximum value and the minimum value of the current amount in each phase. Further, FIG. 4 is a graph obtained by extracting, from FIG. 3, a difference between the maximum value and the minimum value of the current amount in each phase.

Figure 4:
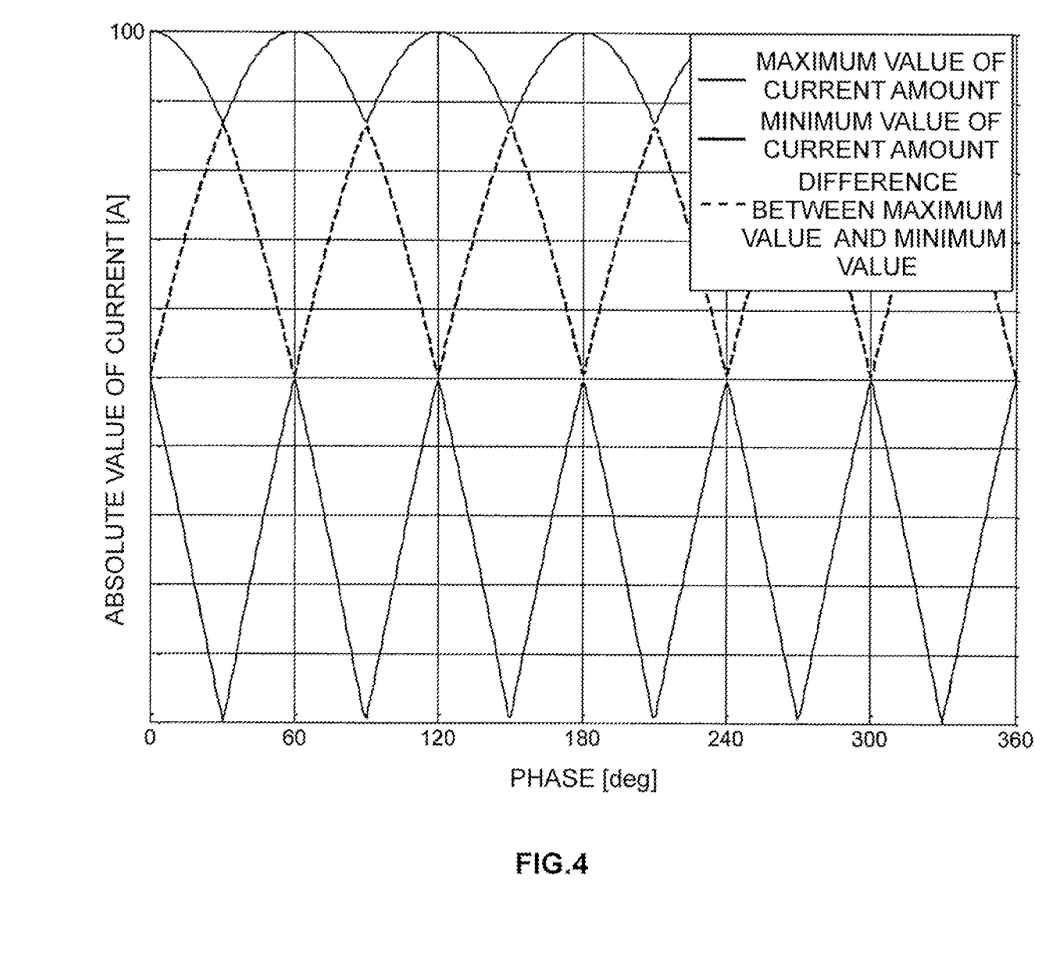
FIG. 4 is a graph obtained by extracting a difference between the maximum value and the minimum value of the current amount in each phase.

As seen from FIG. 4, when the phases are 0 degrees, degrees, 120 degrees, 180 degrees, 240 degrees, and 300 degrees, the difference between the maximum value and the minimum value of the current amount of each phase is minimum. Further, when the phases are 30 degrees, 90 degrees, 150 degrees, 210 degrees, 270 degrees, and 330 degrees, the difference between the maximum value and the minimum value of the current amount of each phase is maximum.

Figure 5:
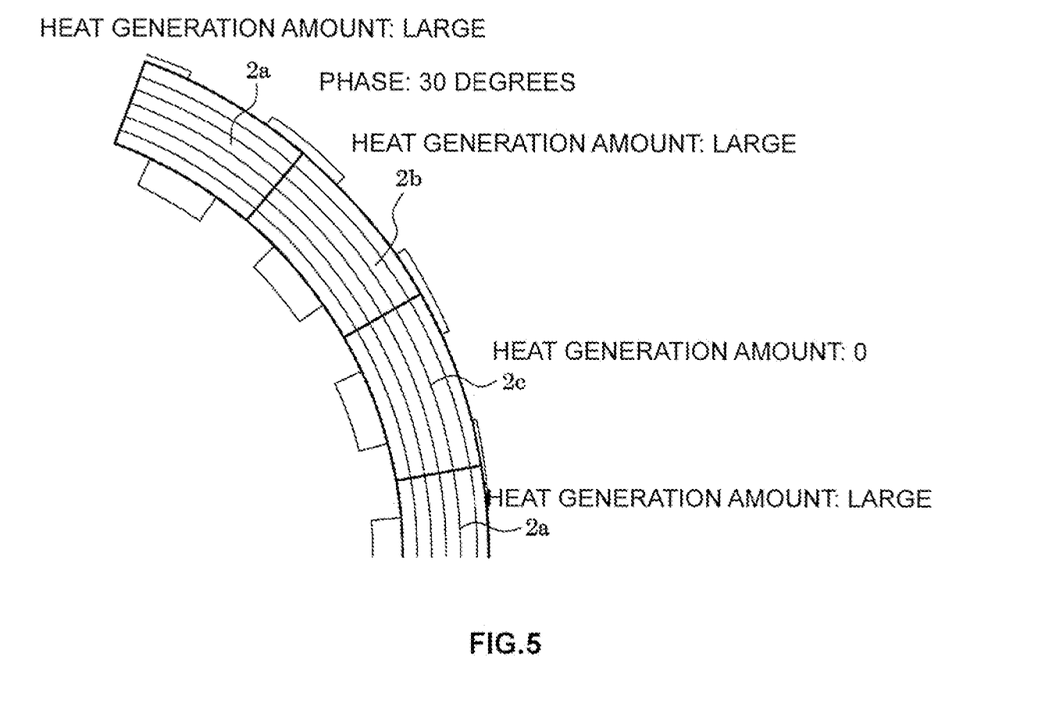
FIG. 5 is a view for illustrating a heat generation amount of a coil of each phase in the rotating electric machine at a phase of 30 degrees.

FIG. 5 shows the heat generation amount of the coil of each phase in the rotating electric machine 2 at a phase of 30 degrees. In FIG. 5, the heat generation amount of a W-phase coil 2a is large, the heat generation amount of a U-phase coil 2b is also large, and the heat generation amount of a V-phase coil 2b is zero. As seen from this figure, at the phase of 30 degrees, the heat generation amounts of the coils adjacent to each other in the rotating electric machine 2 are simultaneously increased.

Figure 6:
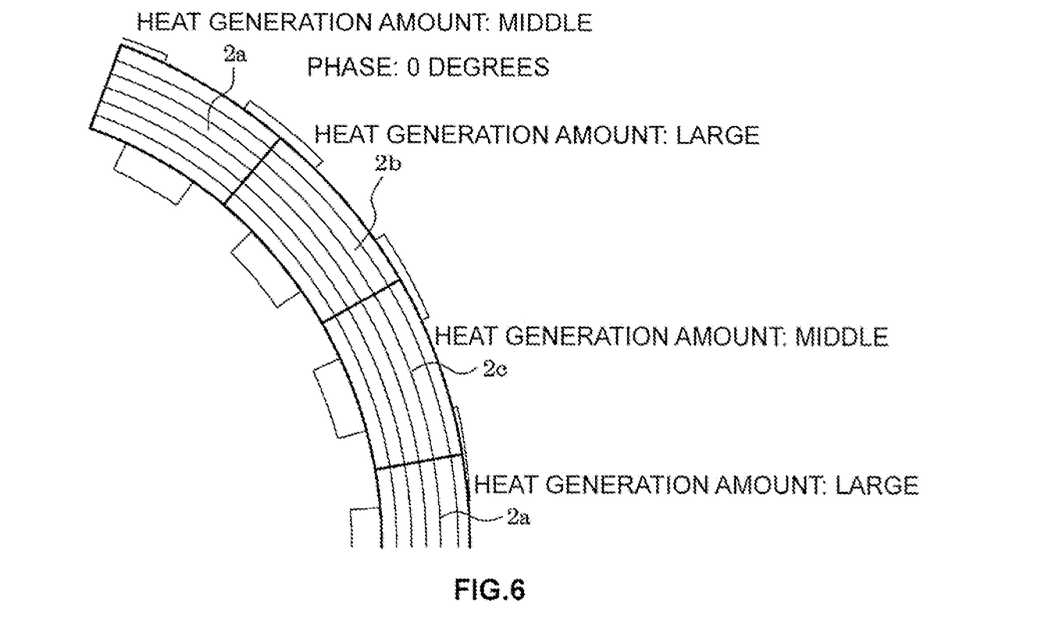
FIG. 6 is a view for illustrating a heat generation amount of the coil of each phase in the rotating electric machine at a phase of 0 degrees.

FIG. 6 shows the heat generation amount of the coil of each phase in the rotating electric machine 2 at a phase of 0 degrees. In FIG. 6, the heat generation amount of the W-phase coil 2a is middle, the heat generation amount of the U-phase coil 2b is large, and the heat generation amount of the V-phase coil 2c is middle. As seen from this figure, at the phase of 0 degrees, the heat generation amounts of the coils adjacent to each other in the rotating electric machine 2 are prevented from being simultaneously increased.

In the fourth embodiment, the control unit 8 of the drive device 3 is configured to set the inverter switching signal so that the electrical angle of the rotating electric machine 2 detected by the angle sensor 9 is matched with the phase at which the difference between the maximum value and the minimum value of the current amount of each phase of the rotating electric machine 2 is minimum. In this manner, the heat generation amounts of the coils adjacent to each other in the rotating electric machine 2 are prevented from being simultaneously increased, and hence even a case in which the heat resistance characteristic of the rotating electric machine 2 is low can be coped with.

Fifth Embodiment

The control unit 8 of the drive device 3 according to the fifth embodiment is configured to select one set angle from one or a plurality of predetermined set angles based on the electrical angle of the rotating electric machine 2 detected by the angle sensor 9. The control unit 8 of the drive device 3 is configured to set the inverter switching signal based on the selected one set angle.

For example, the plurality of set angles are 0 degrees, 60 degrees, 120 degrees, 180 degrees, 240 degrees, and 300 degrees of FIG. 2. The control unit 8 of the drive device 3 is configured to select, from those six set angles, a set angle closest to the electrical angle of the rotating electric machine 2 detected by the angle sensor 9.

In general, in some cases, the value of the electrical angle detected by the angle sensor 9 fluctuates due to noise or the like even when the rotating electric machine 2 is not actually rotated. When the inverter switching signal is set based on this fluctuating electrical angle, torque may be generated in the rotating electric machine 2 to cause vibration of the rotating electric machine 2. In the fifth embodiment, the inverter switching signal can be prevented from being set based on the fluctuating electrical angle.

Sixth Embodiment

Next, a drive device for a rotating electric machine according to the sixth embodiment of the present invention is described.

Figure 7:
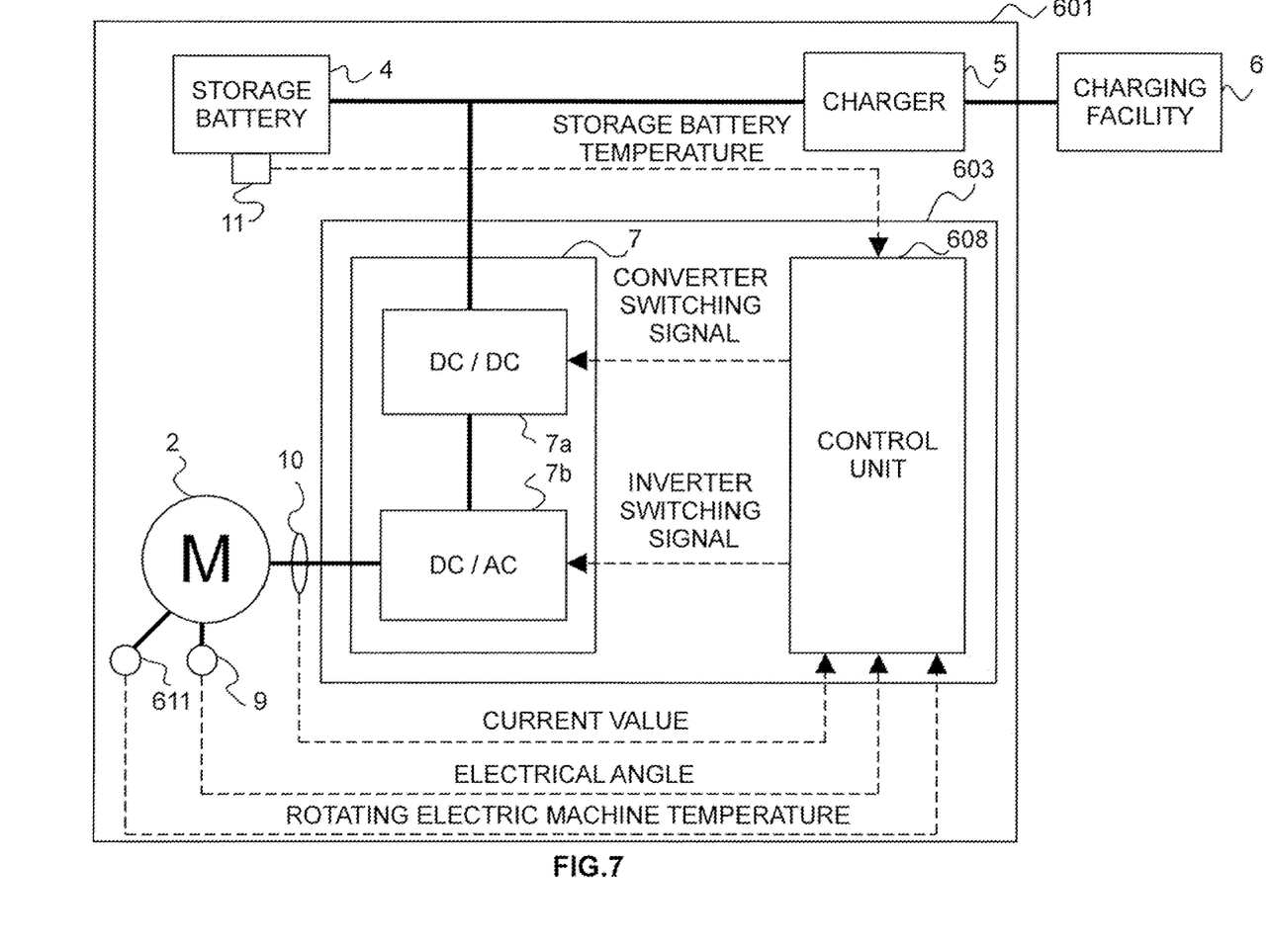
FIG. 7 is a block diagram for illustrating configurations of a charging facility and a vehicle having mounted thereon a drive device for a rotating electric machine according to a sixth embodiment of the present invention.

FIG. 7 is a block diagram for illustrating configurations of a charging facility 6 and a vehicle 601 having mounted thereon a drive device 603 for a rotating electric machine 2 according to the sixth embodiment of the present invention. Description of the same configurations as or configurations similar to those of the first embodiment is omitted, and only configurations specific to the sixth embodiment are described in detail.

A control unit 608 of the drive device 603 is configured to perform control similar to that in the above-mentioned fourth embodiment. That is, the control unit 608 is configured to set the inverter switching signal so that the electrical angle of the rotating electric machine 2 detected by the angle sensor 9 is matched with the phase at which the difference between the maximum value and the minimum value of the current amount of each phase of the rotating electric machine 2 is minimum.

Further, in the rotating electric machine 2, a temperature sensor 612 is mounted to only one phase among the U-phase, the V-phase, and the W-phase. The phase to which this temperature sensor 612 is mounted is a phase having a maximum current amount at a phase with which the electrical angle of the rotating electric machine 2 is to be matched by the control unit 608 of the drive device 603, that is, at a target phase.

For example, there is considered a case in which the control unit 608 of the drive device 603 performs control of matching the electrical angle of the rotating electric machine 2 with a target phase of 0 degrees. In this case, with reference to FIG. 2, the phase having the maximum current amount at the phase of 0 degrees is the U-phase. Therefore, the temperature sensor 612 is mounted to the U-phase of the rotating electric machine 2.

When a temperature detected by the temperature sensor 612 becomes higher than a predetermined set temperature, the control unit 608 of the drive device 603 prevents the three-phase AC power from being supplied to the rotating electric machine 2 in order to protect the rotating electric machine 2. This operation is adopted because the temperature of each phase of the rotating electric machine 2 is proportional to the current amount, and when the temperature of the U-phase through which the maximum current amount flows can be detected, the temperatures of the other phases are reliably lower than the temperature of the U-phase.

As described above, in the sixth embodiment of the present invention, the rotating electric machine can be reliably protected by only mounting the temperature sensor to a phase corresponding to the target phase of the electrical angle in the rotating electric machine.

Figure 8:
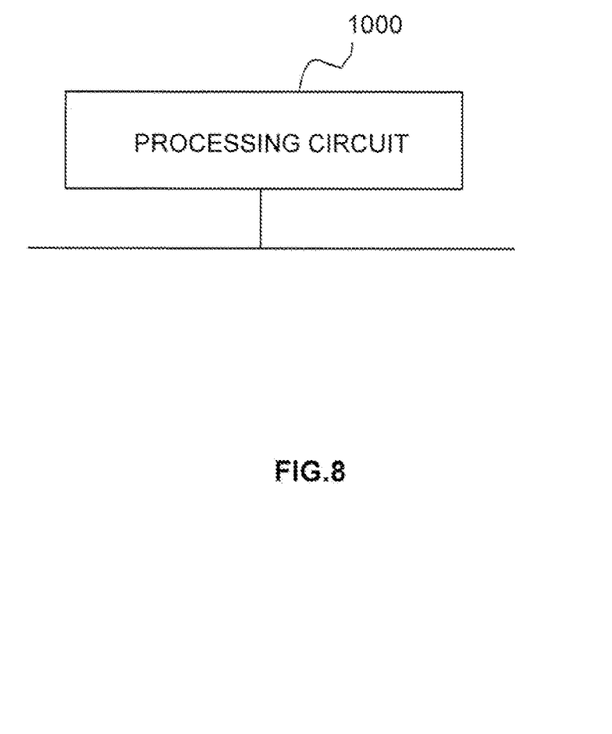
FIG. 8 is a configuration diagram for illustrating a case in which functions of a control unit in the first embodiment to the sixth embodiment of the present invention are implemented by a processing circuit being dedicated hardware.
Figure 9:
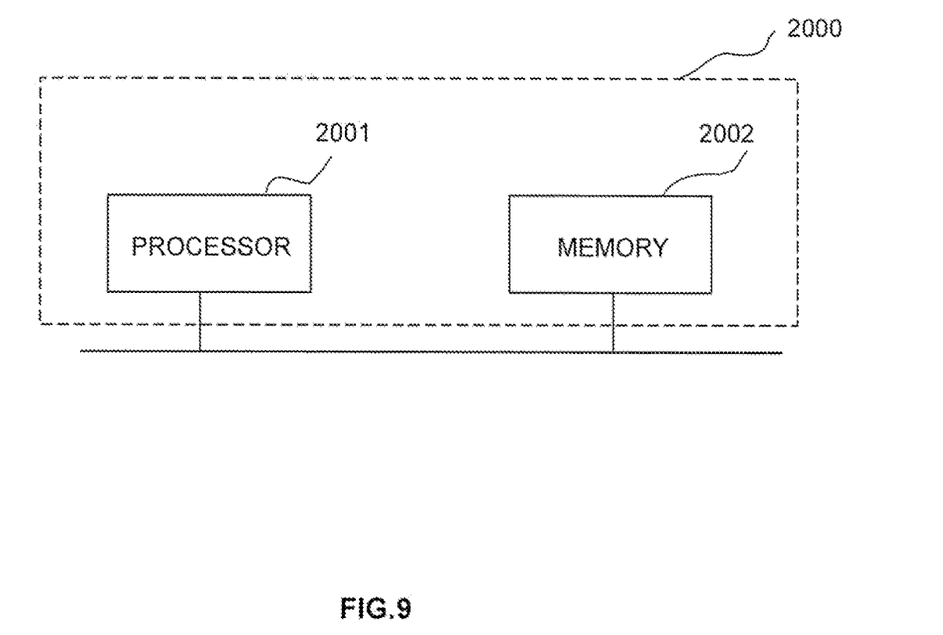
FIG. 9 is a configuration diagram for illustrating a case in which the functions of the control unit in the first embodiment to the sixth embodiment of the present invention are implemented by a processing circuit including a processor and a memory.

Each of the functions of the control units 8 and 608 in the first to sixth embodiments described above is implemented by a processing circuit. The processing circuit for implementing each of the functions may be dedicated hardware, or a processor configured to execute a program stored in a memory. FIG. 8 is a configuration diagram for illustrating a case in which functions of the control units 8 and 608 in the first to fifth embodiments and the sixth embodiment of the present invention are implemented by a processing circuit 1000 being dedicated hardware. Further, FIG. 9 is a configuration diagram for illustrating a case in which the functions of the control units 8 and 608 in the first to fifth embodiments and the sixth embodiment of the present invention are implemented by a processing circuit 2000 including a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof. The functions of the respective units of the control units 8 and 608 may each be implemented by the individual processing circuit 1000, or may be implemented together by one processing circuit 1000.

Meanwhile, when the processing circuit is the processor 2001, the functions of the respective units of the control units 8 and 608 are implemented by software, firmware, or a combination of software and firmware. The software and the firmware are coded as a program and stored in the memory 2002. The processor 2001 reads out and executes the program stored in the memory 2002, to thereby implement the function of each of the units. That is, the control units 8 and 608 each include the memory 2002 configured to store programs the execution of which by the processing circuit 2000 ultimately leads to the implementation of each of the above-mentioned control procedures.

It is also understood that those programs cause a computer to execute the steps and methods described above for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisk, or a DVD.

Some of the functions of the respective units described above may be implemented by dedicated hardware, and others thereof may be implemented by software or firmware.

In this manner, the processing circuit can implement the function of each of the units described above by hardware, software, firmware, or a combination thereof.

REFERENCE SIGNS LIST 1, 601 vehicle, 2 rotating electric machine, 3, 603 drive device, 4 storage battery, 7 power conversion unit, 7a DC/DC converter circuit, 7b DC/AC inverter circuit, 8, 608 control unit.

The invention claimed is:

1. A drive device for a rotating electric machine, comprising:
   a power conversion circuit that comprises a DC/AC inverter circuit, and is configured to convert DC power supplied from a storage battery into AC power, and to supply the AC power to the rotating electric machine; and
   a processor configured to output an inverter switching signal to the DC/AC inverter circuit of the power conversion circuit and output a converter switching signal, and when the storage battery is to be charged, and a temperature of the storage battery is lower than a set temperature suitable for charging, set frequencies of the inverter switching signal and the converter switching signal to maximum frequencies which do not raise a temperature of the power conversion circuit to a value that the power conversion circuit is not capable of withstanding, which is different from frequencies of the inverter switching signal and the converter switching signal in a normal drive state of the rotating electric machine.

2. The drive device of claim 1, wherein the frequencies of the inverter switching signal and the converter switching signal have fixed cycles that are independent of a rotation cycle of an electrical angle of the rotating electric machine.

3. A drive device for a rotating electric machine, comprising:
   a power conversion circuit configured to convert DC power supplied from a storage battery into AC power, supply the AC power to the rotating electric machine, and includes a DC/DC converter circuit, and
   a processor configured to, when the storage battery is to be charged, and a temperature of the storage battery is lower than a set temperature suitable for charging, set a duty ratio of a switching signal for the DC/DC converter circuit so that a boost voltage of the DC/DC converter circuit becomes a boost voltage at which a sum of power losses of the rotating electric machine and the power conversion circuit is maximum.

4. A drive device for a rotating electric machine, comprising:
   a power conversion circuit configured to convert DC power supplied from a storage battery into AC power, supply the AC power to the rotating electric machine, and includes a DC/AC inverter circuit, and
   a processor configured to, when the storage battery is to be charged, and a temperature of the storage battery is lower than a set temperature suitable for charging, set a switching signal for the DC/AC inverter circuit so that an electrical angle of the rotating electric machine input from an outside of the drive device is matched with a phase at which a difference between a maximum value and a minimum value of a current amount of each phase of the rotating electric machine is minimum.

5. The drive device for the rotating electric machine according to claim 4, wherein the processor is configured to prevent three-phase AC power from being supplied to the rotating electric machine when a temperature of a phase corresponding to a target phase of the electrical angle in the rotating electric machine input from the outside of the drive device becomes higher than a predetermined set temperature.

6. A drive device for a rotating electric machine, comprising:
   a power conversion circuit configured to convert DC power supplied from a storage battery into AC power, supply the AC power to the rotating electric machine, and includes a DC/AC inverter circuit, and
   a processor configured to, when the storage battery is to be charged, and a temperature of the storage battery is lower than a set temperature suitable for charging, select one set angle from a plurality of predetermined set angles, that is closest to an electrical angle of the rotating electric machine that is detected by an angle sensor and is input from an outside of the drive device, and set a switching signal for the DC/AC inverter circuit based on the selected one set angle, instead of the electrical angle detected by an angle sensor.

* * * * *